Figure 1:
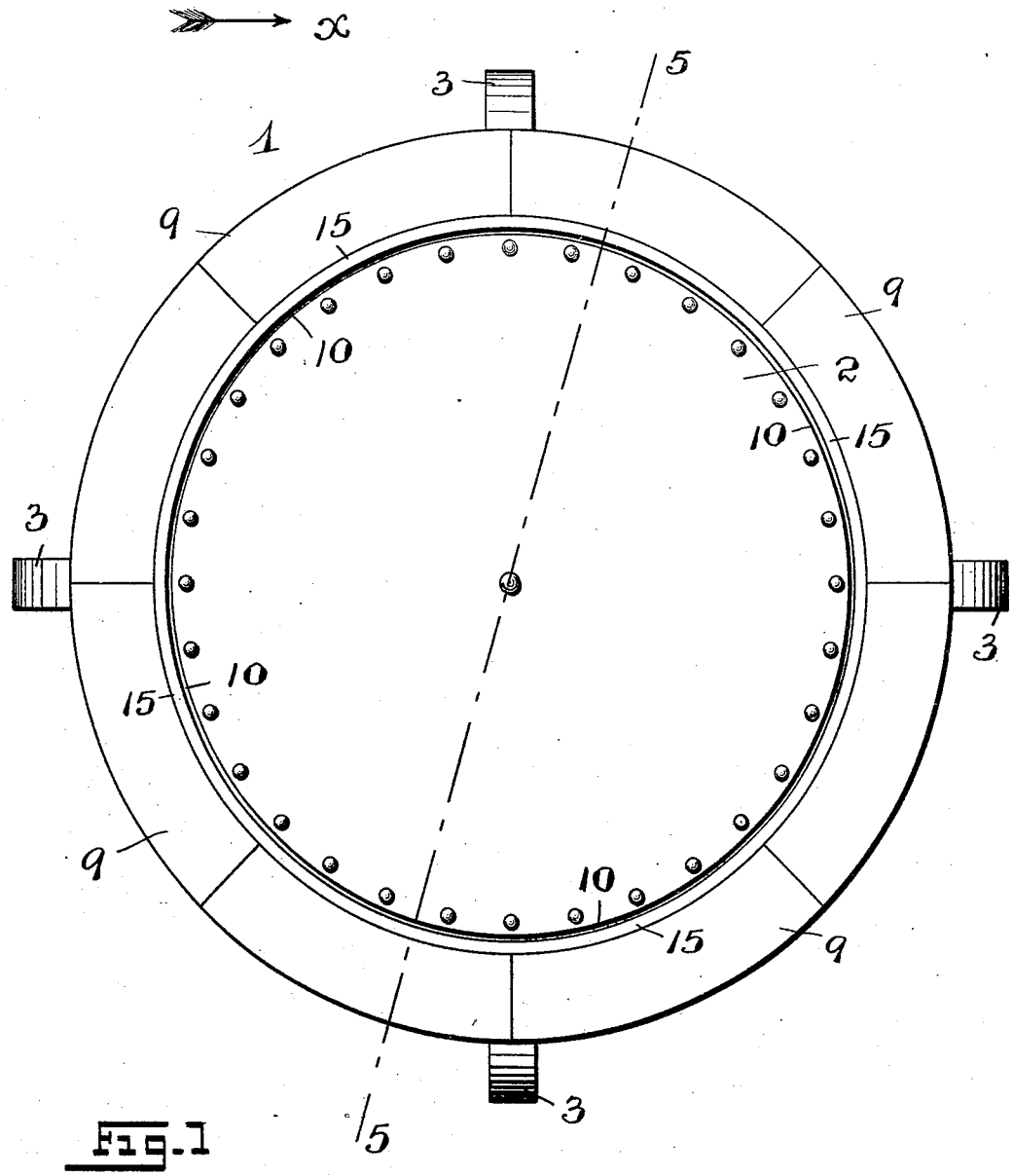

C. W. SMITH.
SKIRT MEASURING DEVICE.
APPLICATION FILED MAY 25, 1909.

943,278.

Patented Dec. 14, 1909.
5 SHEETS—SHEET 1.

WITNESSES:
Fredk. C. W. Fraentzel
Anna H. Alter

INVENTOR:
Clifford W. Smith,
BY
Fraentzel and Richards,
ATTORNEYS.

C. W. SMITH.
SKIRT MEASURING DEVICE.
APPLICATION FILED MAY 25, 1909.

943,278.

Patented Dec. 14, 1909.
5 SHEETS—SHEET 2.

WITNESSES:
Fredk H. W. Fraentzel
Anna H. Acter

INVENTOR:
Clifford W. Smith,
BY
Fraentzel and Richards,
ATTORNEYS.

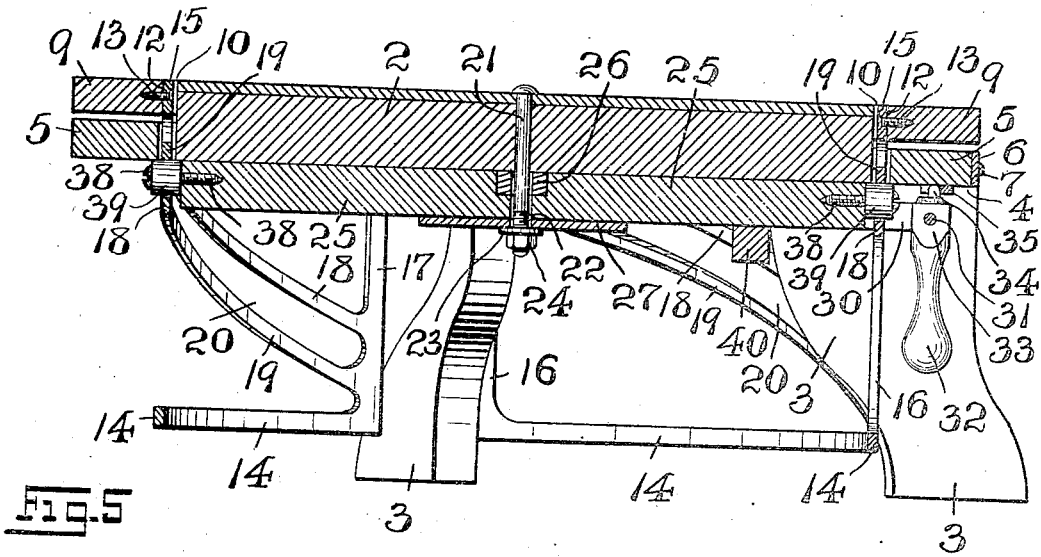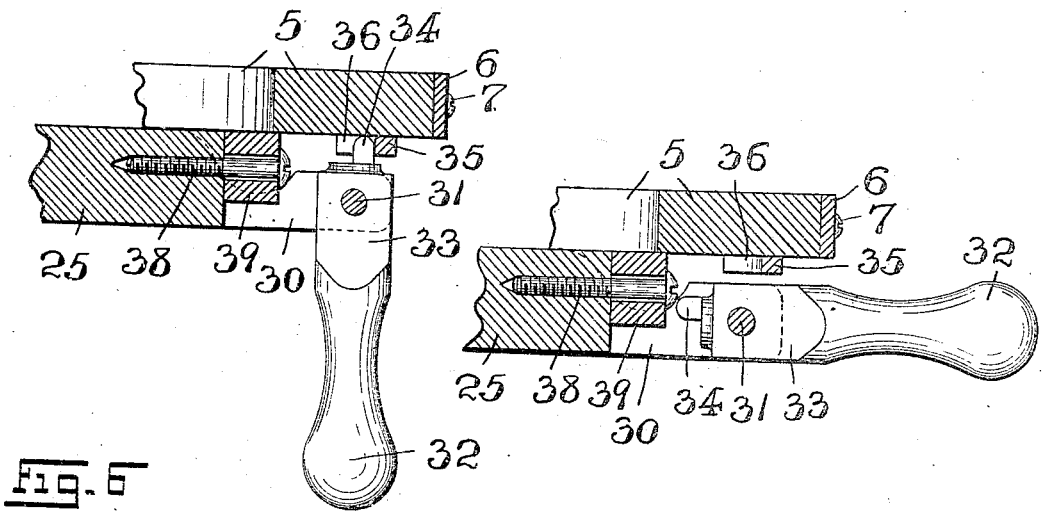

C. W. SMITH.
SKIRT MEASURING DEVICE.
APPLICATION FILED MAY 25, 1909

943,278.

Patented Dec. 14, 1909.

5 SHEETS—SHEET 5.

WITNESSES:
Fredk H. W. Fraentzel
Anna H. Alter

INVENTOR:
Clifford W. Smith,
BY
Fraentzel and Richards,
ATTORNEYS.

UNITED STATES PATENT OFFICE.

CLIFFORD W. SMITH, OF NEWARK, NEW JERSEY.

SKIRT-MEASURING DEVICE.

943,278.  Specification of Letters Patent.  Patented Dec. 14, 1909.

Application filed May 25, 1909. Serial No. 498,279.

*To all whom it may concern:*

Be it known that I, CLIFFORD W. SMITH, a citizen of the United States, residing at Newark, in the county of Essex and State of New Jersey, have invented certain new and useful Improvements in Skirt-Measuring Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in measuring appliances; and, the invention has reference, more particularly, to a novel skirt-measuring device or appliance or hem-finder.

The invention has for its principal object to provide a novel and simply constructed skirt-measuring device or apparatus, comprising a platform for the standing thereon of a person or model upon whom a skirt is to be measured, and a vertically movable measuring ring or element which can be easily and rapidly manipulated and will permit of the laying out or marking of the bottom of the skirt for the hem thereof with great accuracy.

A further object of the present invention is to provide a novel and simply constructed measuring apparatus or hem-finder of the general character hereinafter set forth, in which the movable parts have been reduced to a minimum, so that there is less likelihood of the parts getting out of order, and so as to enable even the most unskilled operator to quickly and perfectly manipulate the device so as to produce perfect accuracy of the length of the skirt and provide an even fit at the bottom of the skirt.

Other objects of this invention not at this time more particularly enumerated will be clearly understood from the following detailed description of my present invention.

This invention consists, primarily, in the novel skirt-measuring device or apparatus hereinafter more fully set forth; and, the invention consists, furthermore, in the novel arrangements and combinations of the various devices and parts, as well as in the details of the construction of the same, all of which will be hereinafter more fully described and then finally embodied in the clauses of the claim which are appended to and which form an essential part of this specification.

The invention is clearly illustrated in the accompanying drawings, in which:—

Figure 2:
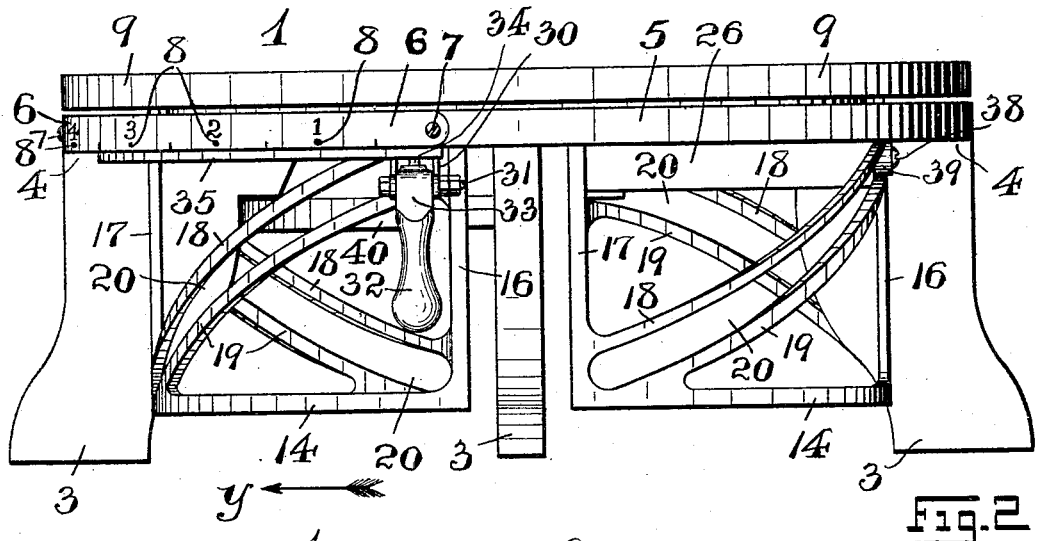
Figure 3:
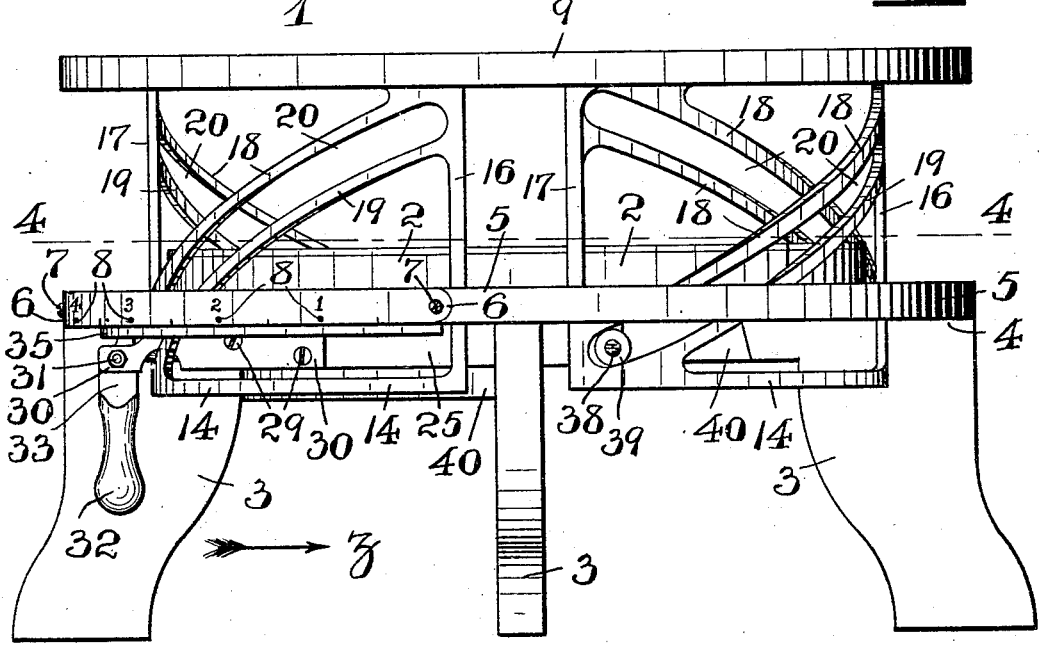
Figure 4:
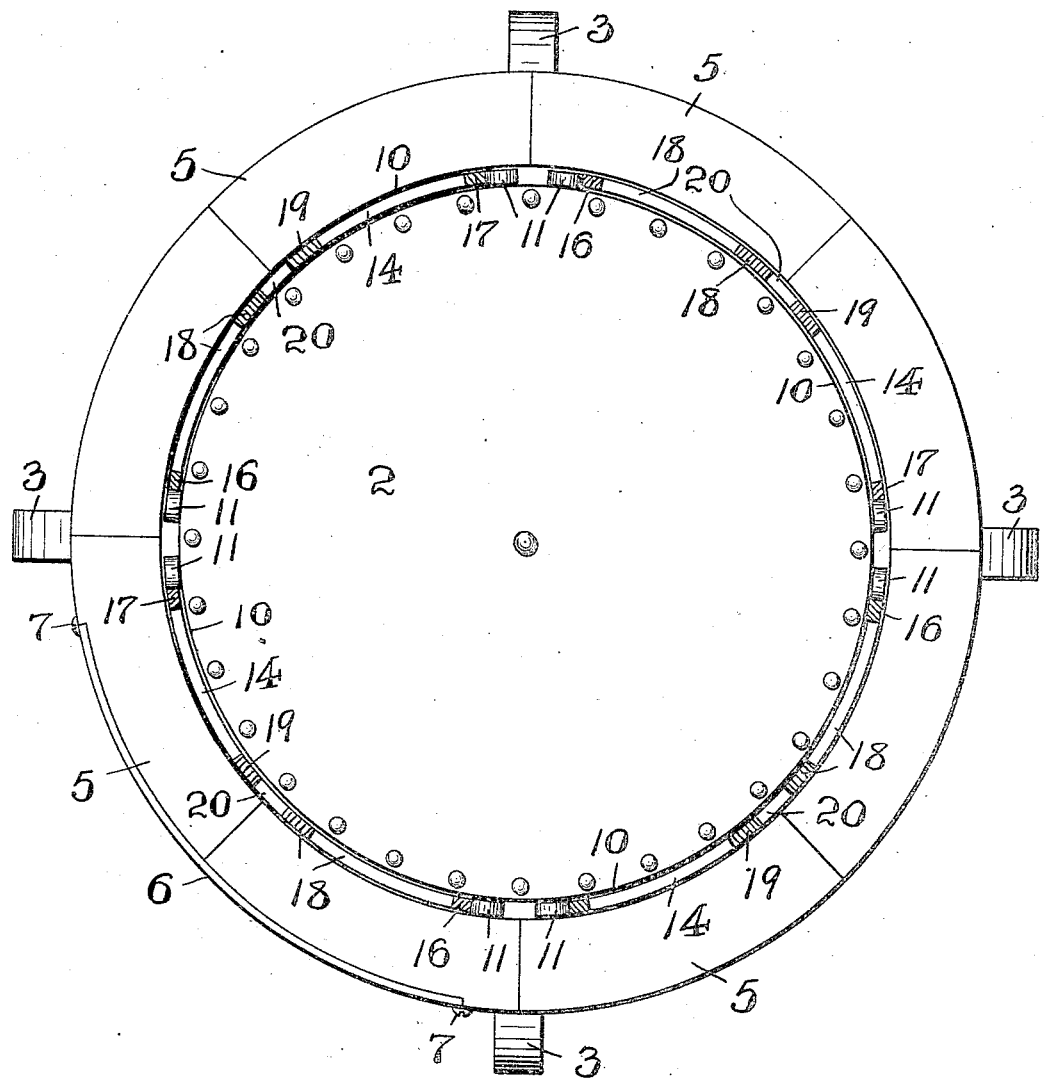
Figure 8:
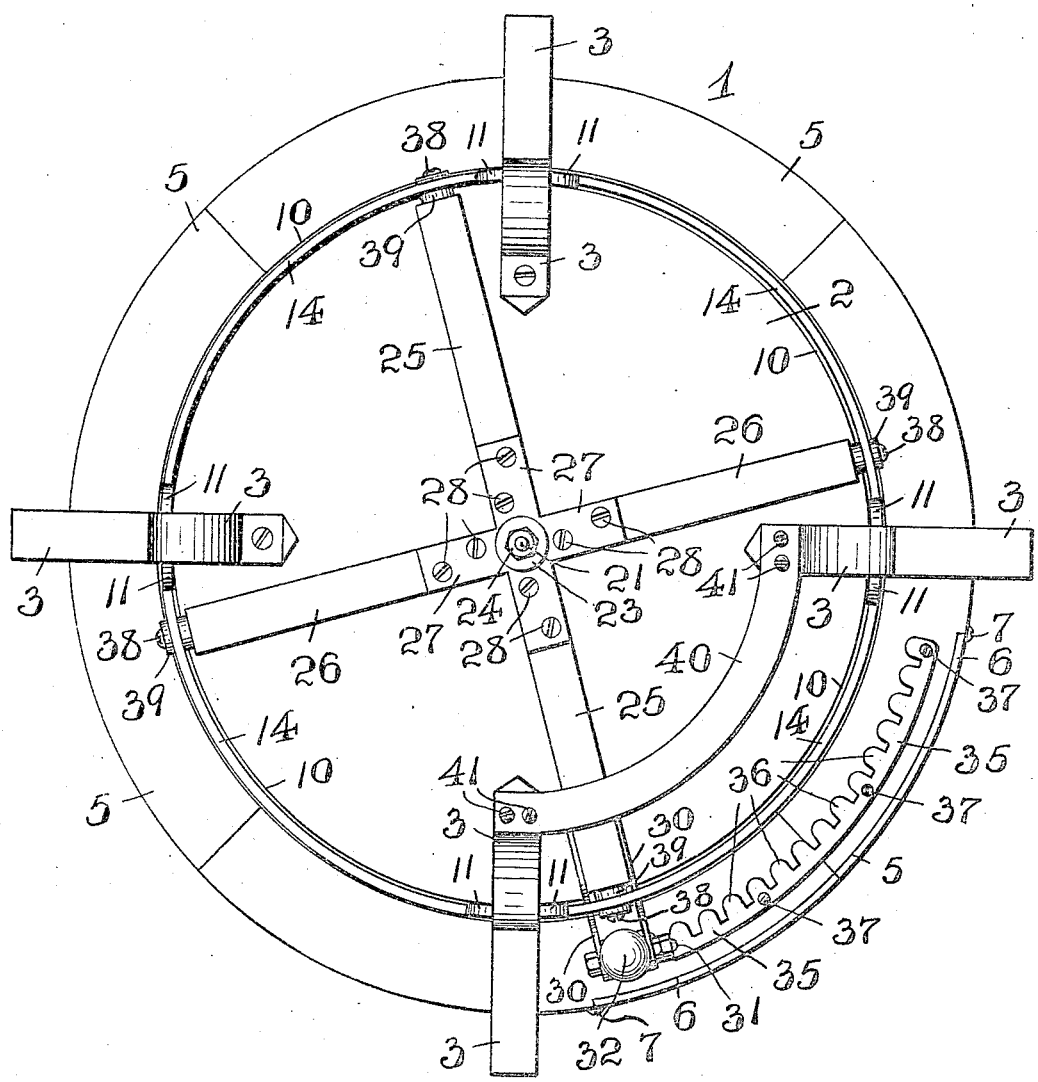

Figure 1 is a top or plan view, and Fig. 2 is a front elevation, of a skirt-measuring device or apparatus made according to and embodying the principles of the present invention. Fig. 3 is a view similar to that represented in said Fig. 2 of the drawings, but showing the measuring-element or hem-finding ring moved into one of its raised positions while measuring or finding the hem of a skirt. Fig. 4 is a horizontal section of the device, said section being taken on line 4—4 in said Fig. 3; and Fig. 5 is a transverse vertical section, said section being taken on line 5—5 in said Fig. 1, looking in the direction of the arrow *x*. Fig. 6 is a detail vertical section of certain parts of the measuring device or apparatus, and with other parts omitted, but illustrating in side elevation in said view an operating lever for the manipulation of the measuring ring, the said lever being shown in one of its locked positions for immovably holding the measuring ring or element in any one of its raised positions; and Fig. 7 is a similar sectional representation of the parts shown in said Fig. 6, and a side elevation of the operating lever, said lever being shown in its unlocked position when moving the measuring ring or element either up or down, said Figs. 6 and 7 being made upon enlarged scales. Fig. 8 is a bottom view of the said measuring device or apparatus.

Similar characters of reference are employed in all of the above described views, to indicate corresponding parts.

Referring now to the said drawings, the reference-character 1 indicates a complete skirt-measuring apparatus or device representing one embodiment of my present invention, the same comprising a main body or platform 2 which is mounted upon suitably formed standards or legs 3. The upper edge-portions of the said standards or legs, at 4, extend beyond the marginal edge-portions of the said main body or platform 2, which as is shown in the several figures of the drawings is preferably of a circular configuration, and suitably mounted and secured upon the said projecting portions 4 of said legs or standards 3 is a ring-like member or element 5, which is concentric with said main body or platform 2, and may be made of a number of suitably connected arc-shaped sections, as represented in Figs. 1, 4 and 8 of the drawings. Suitably secured upon a portion of the said ring-like member or element 5, preferably by means of pins or screws 7, is a measuring plate or scale 6, upon the face of which are any desirable number of inch-marks or graduations, as 8, for the purpose of indicating to the operator of the device or apparatus the height to which a movable measuring ring or element 9 is to be raised in the manner to be presently more fully set forth. As shown in the several figures of the drawings, a slight annular space, as 10, is formed between the said main body or platform 2 and the stationary ring-like member or element 5, and suitably disposed in said space and at suitable intervals, usually at the points where the said legs or standards 3 are secured to said body 2 and said ring-like member or element 5, are suitable guide-rollers 11 which are arranged in pairs, substantially as shown in Figs. 4 and 8 of the drawings.

Suitably secured upon the inner marginal surface-portions 12, of the previously mentioned ring-shaped member or element 9, by means of screws 13, or any other suitable fastening means, are suitable arc-shaped frames, usually four of such frames being used, and each frame comprising a top-bar 15, a bottom-bar 14, and connecting end-bars 16 and 17. Extending from the upper right-hand corner and running to the lower left-hand corner of each frame are a pair of angularly disposed and parallel bars or members 18 and 19, formed with a space 20 between them, said bars or members 18 and 19 being outwardly bowed or curved, so as to conform to the outwardly curving or bowed top-bar 15 and bottom-bar 14 of each frame. The said four frames are arranged in such manner, that each frame is arranged between each pair of said legs or standards 3, and the outer marginal edges of the end-bars 16 and 17 ride upon and against the said guide-rollers 11, as will be clearly evident.

The previously mentioned main body or platform 2 has a downwardly extending pivot-post or king-bolt 21 provided upon its lower screw-threaded part 22 with a washer 23 and a nut 24. Rotatably arranged upon that part of said post or king-bolt 21, between said washer 23 and the under face of said main body or platform 2 are a pair of crossed bars, as 25 and 26, having their free end-portions terminating at or near the circumferential edge of the circular main body or platform 2, and said bars 25 and 26 being suitably secured together by means of a cross-shaped casting 27, or other similarly constructed fastening device or brace, which is suitably secured to the centrally crossed bars 25 and 26 by means of pins or screws 28, as clearly shown in Fig. 8 of the drawings. Suitably secured to the opposite sides, at the one end-portion of the said bar 25, by means of screws 29, are a pair of plates 30, said plates extending beyond the end of said bar 25 and being provided with a pivot-pin 31 which extends across the space formed between the projecting end-portions of the said plates 30. Pivotally suspended from said pin 31 is the perforated body 33 of a lever or arm 32, and 34 is a suitably formed stud or projection which is adapted to be moved or swung into locked or holding engagement with any adjacent pair of a series of teeth or projections 36 of a rack-like plate 35 which is suitably secured to the under face of the fixed or stationary ring-like member or element 5, by means of pins or screws 37. When the said stud or projection 34 of the operating lever is in the position shown more particularly in Figs. 5 and 6 of the drawings, it will be evident that the parts are locked against movement; but, when the lever is turned into the position indicated in Fig. 7, so as to remove the said lug or projection 34 from the space between two of such teeth or projections 36, it will be clearly understood that a rotary movement of the crossed bars 25 and 26 can be produced. To cause the previously mentioned movable measuring ring or element 9 to be moved in an upward or downward direction, according to the movement of the lever or arm, by the operator laterally to the left or right, the said crossed bars 25 and 26 are provided with suitable screws or pivot-pins, as 38, a roller or wheel 39 being rotatably arranged upon each screw or pin 38, and each roller or wheel 39 extending into a downwardly inclined or angular space 20 and being in rolling contact or engagement with the edges of the angularly disposed bars or members 18 and 19. Thus, it will be clearly evident, that the rotary horizontal movements of the crossed bars 25 and 26, and the respective rollers or wheels 39, will produce a vertical movement of the measuring ring or element 9, and this movement will be in an upward direction when the lever or arm is moved in the direction of the arrow $y$ in said Fig. 2, or it will be in a downward direction when the said lever or arm is moved in the direction of the arrow $z$ in said Fig. 3 of the drawings.

If desired, a connecting brace or bar 40 may be secured by means of screws 41 to suitable portions of two of the said legs or standards 3, which acts as a support upon which that portion of the bar 25 moves, with which the operating lever or arm is connected, as clearly illustrated in Figs. 5 and 8 of the drawings.

In using the device or apparatus for the purpose of securing an even length of the skirt around the bottom, the person on whom the skirt is to be fitted stands upon the stationary main body or platform 2, and then by means of the lever or arm the marking-ring or element is moved to the desired height, the parts being locked in their adjusted positions by means of turning the lever or arm downwardly again, when brought opposite the mark or graduation 8 of the scale 7 indicating the height of the bottom of the skirt that is desired. The lower edge or hem of the skirt can now be fitted to the ring-shaped element 9, either by "chalking" or by "pinning." When this has been accomplished, the lever or arm is again brought into its released position, and the element 9 is lowered by moving the arm or lever in the direction of the arrow $z$ in Fig. 3 of the drawings, until the parts have reached their normal initial relations represented in Fig. 2 of the drawings.

I am fully aware that changes may be made in the general arrangements and combinations of the devices and parts without departing from the scope of my present invention as described in the specification and as defined in the claims which are appended to the said specification. Hence, I do not limit this invention to the exact arrangements and combinations of the devices and parts as set forth in the said specification, nor do I confine myself to the exact details of the construction of the said parts as illustrated in the accompanying drawings.

I claim:—

1. A skirt-measuring device comprising a fixed main body or platform, a stationary ring-shaped element surrounding the said main body or platform and forming with said body or platform an annular space, a measuring element movably disposed above said body or platform and said stationary ring-shaped element, and means extending from said measuring element and movably arranged in said annular space for moving said measuring element in an upward or downward direction.

2. A skirt-measuring device comprising a fixed main body or platform, a stationary ring-shaped element surrounding the said main body or platform and forming with said body or platform an annular space, a measuring element movably disposed above said body or platform and said stationary ring-shaped element, means extending from said measuring element and movably arranged in said annular space for moving said measuring element in an upward or downward direction, and means for locking said measuring element in any one of its adjusted positions.

3. A skirt-measuring device comprising a fixed main body or platform, a stationary ring-shaped element surrounding the said main body or platform and forming with said body or platform an annular space, a measuring element movably disposed above said body or platform and said stationary ring-shaped element, means extending from said measuring element and movably arranged in said annular space for moving said measuring element in an upward direction, and means rotatably connected with said main body or platform having a portion in engagement with the means which extends downwardly from said measuring element for operating said element.

4. A skirt-measuring device comprising a fixed main body or platform, a stationary ring-shaped element surrounding the said main body or platform and forming with said body or platform an annular space, a measuring element movably disposed above said body or platform and said stationary ring-shaped element, means extending from said measuring element and movably arranged in said annular space for moving said measuring element in an upward or downward direction, means rotatably connected with said main body or platform having a portion in engagement with the means which extends downwardly from said measuring element for operating said element, and means connected with said rotatable means for locking said measuring element in any one of its adjusted positions.

5. A skirt-measuring device comprising a fixed main body or platform, a stationary ring-shaped element surrounding the said main body or platform and forming with said body or platform an annular space, a measuring element movably disposed above said body or platform and said stationary ring-shaped element, means extending from said measuring element and movably arranged in said annular space for moving said measuring element in an upward or downward direction, a rack attached to said stationary ring-shaped element, a pivoted lever, and a stud extending from said lever adapted to be brought in engagement with said rack for locking said measuring element in any one of its adjusted positions.

6. A skirt-measuring device comprising a fixed main body or platform, a stationary ring-shaped element surrounding the said main body or platform and forming with said body or platform an annular space, a measuring element movably disposed above said body or platform and said stationary ring-shaped element, means extending from said measuring element and movably arranged in said annular space for moving said measuring element in an upward or downward direction, means rotatably connected with said main body or platform having a portion in engagement with the means which extends downwardly from said measuring element for operating said element, a rack attached to said stationary ring-shaped element, a lever pivotally connected with said rotatable means which is connected with said main body or platform, and a stud extending from said lever adapted to be brought in engagement with said rack for locking said measuring element in any one of its adjusted positions.

7. A skirt-measuring device comprising a fixed main body or platform, a stationary ring-shaped element surrounding the said main body or platform and forming with said body or platform an annular space, a measuring element movably disposed above said body or platform and said stationary ring-shaped element, guide-rollers arranged in said annular space, frame-sections extending from said measuring element and movably arranged in said annular space, angularly disposed guides connected with said frame-sections, and rollers connected with said main body or platform, said rollers being in rolling engagement with said guides, substantially as and for the purposes set forth.

8. A skirt-measuring device comprising a fixed main body or platform, a stationary ring-shaped element surrounding the said main body or platform and forming with said body or platform an annular space, a measuring element movably disposed above said body or platform and said stationary ring-shaped element, guide-rollers arranged in said annular space, frame-sections extending from said measuring element and movably arranged in said annular space, angularly disposed guides connected with said frame-sections, rollers connected with said main body or platform, said rollers being in rolling engagement with said guides, and means for locking said measuring element in any one of its adjusted positions.

9. A skirt-measuring device comprising a fixed main body or platform, a stationary ring-shaped element surrounding the said main body or platform and forming with said body or platform an annular space, a measuring element movably disposed above said body or platform and said stationary ring-shaped element, guide-rollers arranged in said annular space, frame-sections extending from said measuring element and movably arranged in said annular space, angularly disposed guides connected with said frame-sections, a king-bolt extending from said main body or platform, crossed bars rotatably mounted upon said bolt, and a roller at the end of each bar, said rollers being in rolling engagement with said guides, substantially as and for the purposes set forth.

10. A skirt-measuring device comprising a fixed main body or platform, a stationary ring-shaped element surrounding the said main body or platform and forming with said body or platform an annular space, a measuring element movably disposed above said body or platform and said stationary ring-shaped element, guide-rollers arranged in said annular space, frame-sections extending from said measuring element and movably arranged in said annular space, angularly disposed guides connected with said frame-sections, a king-bolt extending from said main body or platform, crossed bars rotatably mounted upon said bolt, a roller at the end of each bar, said rollers being in rolling engagement with said guides, and means connected with one of said cross-bars for locking said measuring element in any one of its adjusted positions.

11. A skirt-measuring device comprising a fixed main body or platform, a stationary ring-shaped element surrounding the said main body or platform and forming with said body or platform an annular space, a measuring element movably disposed above said body or platform and said stationary ring-shaped element, guide-rollers arranged in said annular space, frame-sections extending from said measuring element and movably arranged in said annular space, angularly disposed guides connected with said frame-sections, rollers connected with said main body or platform, said rollers being in rolling engagement with said guides, a rack attached to said stationary ring-shaped element, a pivoted lever, and a stud extending from said lever adapted to be brought in engagement with said rack for locking said measuring element in any one of its adjusted positions.

12. A skirt-measuring device comprising a fixed main body or platform, a stationary ring-shaped element surrounding the said main body or platform and forming with said body or platform an annular space, a measuring element movably disposed above said body or platform and said stationary ring-shaped element, guide-rollers arranged in said annular space, frame-sections extending from said measuring element and movably arranged in said annular space, angularly disposed guides connected with said frame-sections, a king-bolt extending from said main body or platform, crossed bars rotatably mounted upon said bolt, a roller at the end of each bar, said rollers being in rolling engagement with said guides, a rack attached to said stationary ring-shaped element, a lever pivotally connected with an end-portion of one of said cross-bars, and a stud extending from said lever adapted to be brought in engagement with said rack for locking said measuring element in any one of its adjusted positions.

13. The herein described skirt measuring device comprising a platform, legs extending from said platform, a ring-shaped element secured upon said legs, said ring-shaped element surrounding said platform and forming with said platform an annular space, a ring-shaped measuring element, guide-rollers arranged in said annular space, a multiplicity of arc-shaped frame-sections secured within and extending downwardly from said ring-shaped measuring element, said frame-sections being movably arranged in said annular space, each frame-section comprising a top-bar, a bottom-bar, a pair of vertical end bars, said end-bars being in guiding engagement with said guiding rollers, and a pair of angularly disposed and parallel bars extending from one of the upper corners to one of the lower corners of said frame-section, said angular bars having a space between them forming guides, and rollers connected with said platform, said rollers extending into said guides and being in rolling engagement with said angular bars, substantially as and for the purposes set forth.

14. The herein described skirt-measuring device comprising a platform, legs extending from said platform, a ring-shaped element secured upon said legs, said ring-shaped element surrounding said platform and forming with said platform an annular space, a ring-shaped measuring element, guide-rollers arranged in said annular space, a multiplicity of arc-shaped frame-sections secured within and extending downwardly from said ring-shaped measuring element, said frame-sections being movably arranged in said annular space, each frame-section comprising a top-bar, a bottom-bar, a pair of vertical end bars, said end bars being in guiding engagement with said guiding rollers, and a pair of angularly disposed and parallel bars extending from one of the upper corners to one of the lower corners of said frame-section, said angular bars having a space between them forming guides, rollers connected with said platform, said rollers extending into said guides and being in rolling engagement with said angular bars, and means for locking said measuring element in any one of its adjusted positions.

15. The herein described skirt measuring device comprising a platform, legs extending from said platform, a ring-shaped element secured upon said legs, said ring-shaped element surrounding said platform and forming with said platform an annular space, a ring-shaped measuring element, guide-rollers arranged in said annular space, a multiplicity of arc-shaped frame-sections secured within and extending downwardly from said ring-shaped measuring element, said frame-sections being movably arranged in said annular space, each frame-section comprising a top-bar, a bottom-bar, a pair of vertical end bars, said end bars being in guiding engagement with said guiding rollers, and a pair of angularly disposed and parallel bars extending from one of the upper corners to one of the lower corners of said frame-section, said angular bars having a space between them forming guides, a king-bolt extending from said platform, crossed bars rotatably mounted upon said king-bolt, and a roller at the end of each bar, said rollers extending into said guides and being in rolling engagement with said angular bars, substantially as and for the purposes set forth.

16. The herein described skirt-measuring device comprising a platform, legs extending from said platform, a ring-shaped element secured upon said legs, said ring-shaped element surrounding said platform and forming with said platform an annular space, a ring-shaped measuring element, guide-rollers arranged in said annular space, a multiplicity of arc-shaped frame-sections secured within and extending downwardly from said ring-shaped measuring element, said frame-sections being movably arranged in said annular space, each frame-section comprising a top-bar, a bottom-bar, a pair of vertical end bars, said end bars being in guiding engagement with said guiding rollers, and a pair of angularly disposed and parallel bars extending from one of the upper corners to one of the lower corners of said frame-section, said angular bars having a space between them forming guides, a king-bolt extending from said platform, crossed bars rotatably mounted upon said king-bolt, a roller at the end of each bar, said rollers extending into said guides and being in rolling engagement with said angular bars, and means connected with one of said cross-bars for locking said measuring element in any one of its adjusted positions.

17. The herein described skirt measuring device comprising a platform, legs extending from said platform, a ring-shaped element secured upon said legs, said ring-shaped element surrounding said platform and forming with said platform an annular space, a ring-shaped measuring element, guide-rollers arranged in said annular space, a multiplicity of arc-shaped frame-sections secured within and extending downwardly from said ring-shaped measuring element, said frame-sections being movably arranged in said annular space, each frame-section comprising a top-bar, a bottom-bar, a pair of vertical end bars, said end-bars being in guiding engagement with said guiding rollers, and a pair of angularly disposed and parallel bars extending from one of the upper corners to one of the lower corners of said frame-section, said angular bars having a space between them forming guides, rollers connected with said platform, said rollers extending into said guides and being in rolling engagement with said angular bars, a rack attached to said stationary ring-shaped element, a pivoted lever, and a stud extending from said lever adapted to be brought in engagement with said rack for locking said measuring element in any one of its adjusted positions.

18. The herein described skirt measuring device comprising a platform, legs extending from said platform, a ring-shaped element secured upon said legs, said ring-shaped element surrounding said platform and forming with said platform an annular space, a ring-shaped measuring element, guide-rollers arranged in said annular space, a multiplicity of arc-shaped frame-sections secured within and extending downwardly from said ring-shaped measuring element, said frame-sections being movably arranged in said annular space, each frame-section comprising a top-bar, a bottom-bar, a pair of vertical end bars, said end-bars being in guiding engagement with said guiding rollers, and a pair of angularly disposed and parallel bars extending from one of the upper corners to one of the lower corners of said frame-section, said angular bars having a space between them forming guides, a king-bolt extending from said platform, crossed bars rotatably mounted upon said king-bolt, a roller at the end of each bar, said rollers extending into said guides and being in rolling engagement with said angular bars, a rack attached to said stationary ring-shaped element, a lever pivotally connected with an end-portion of one of said cross-bars, and a stud extending from said lever adapted to be brought in engagement with said rack for locking said measuring element in any one of its adjusted positions.

In testimony, that I claim the invention set forth above I have hereunto set my hand this 21st day of May, 1909.

CLIFFORD W. SMITH.

Witnesses:
FREDK. C. FRAENTZEL,
FREDK H. W. FRAENTZEL.